United States Patent Office 3,562,044
Patented Feb. 9, 1971

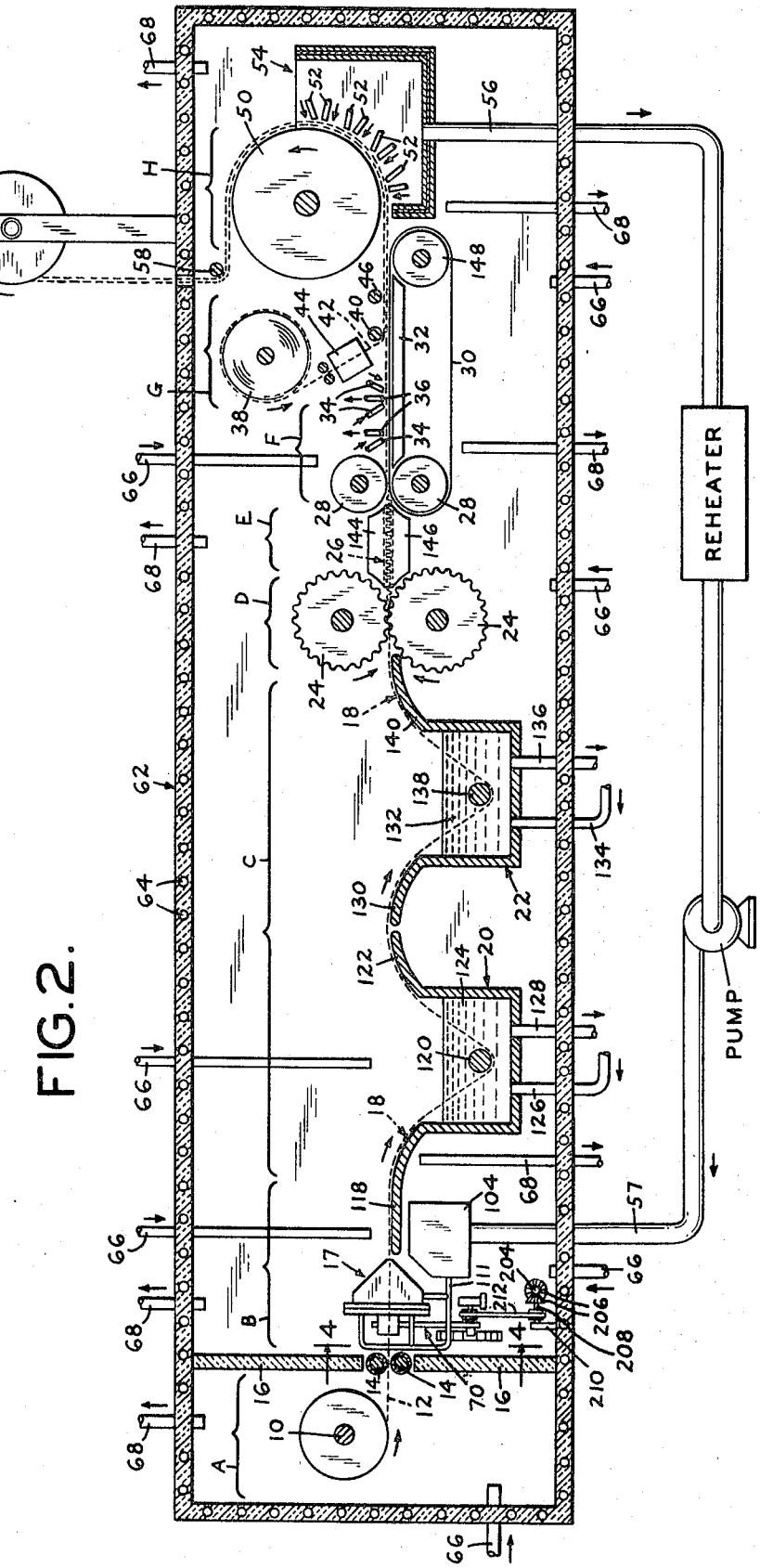

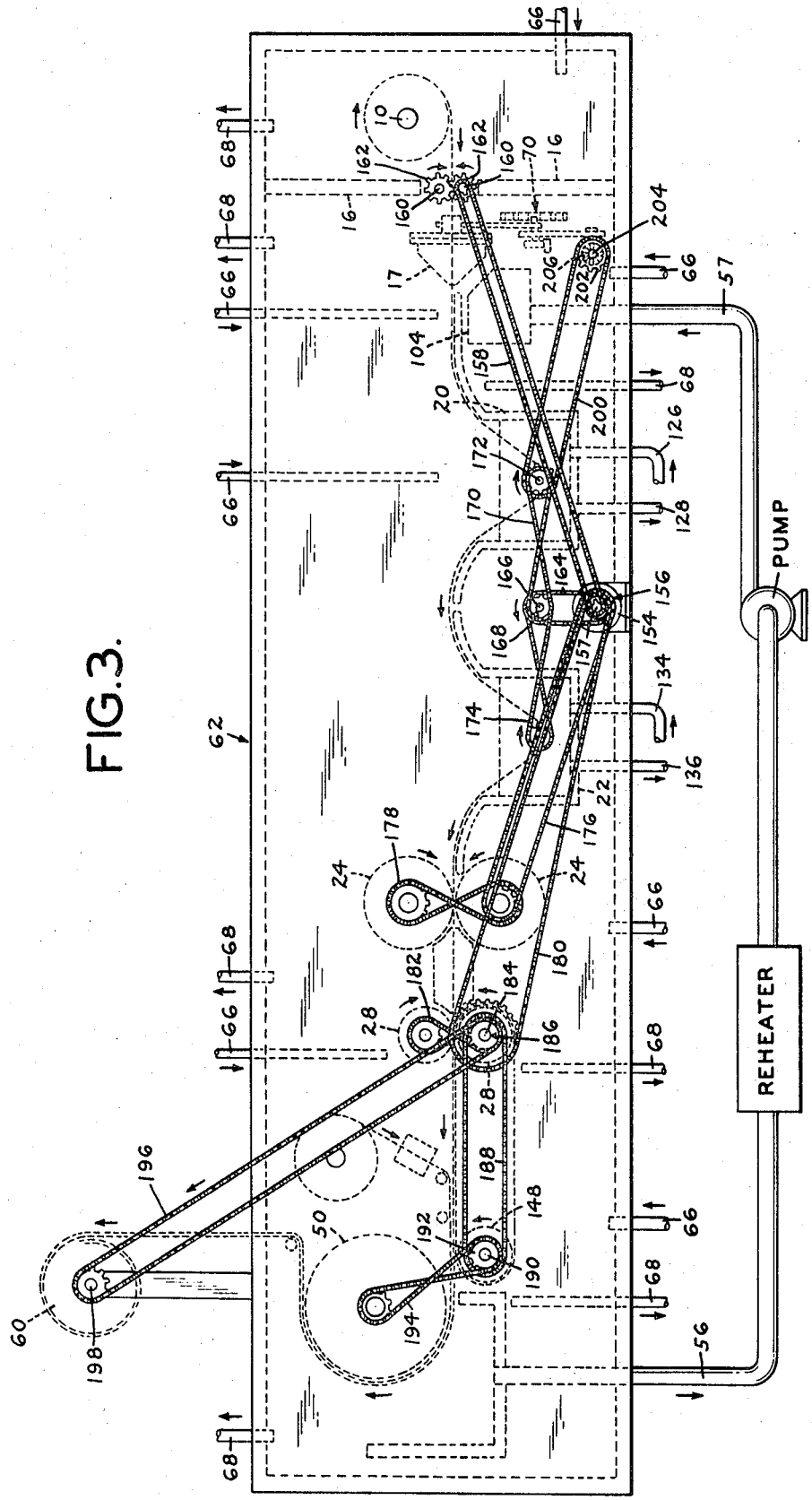

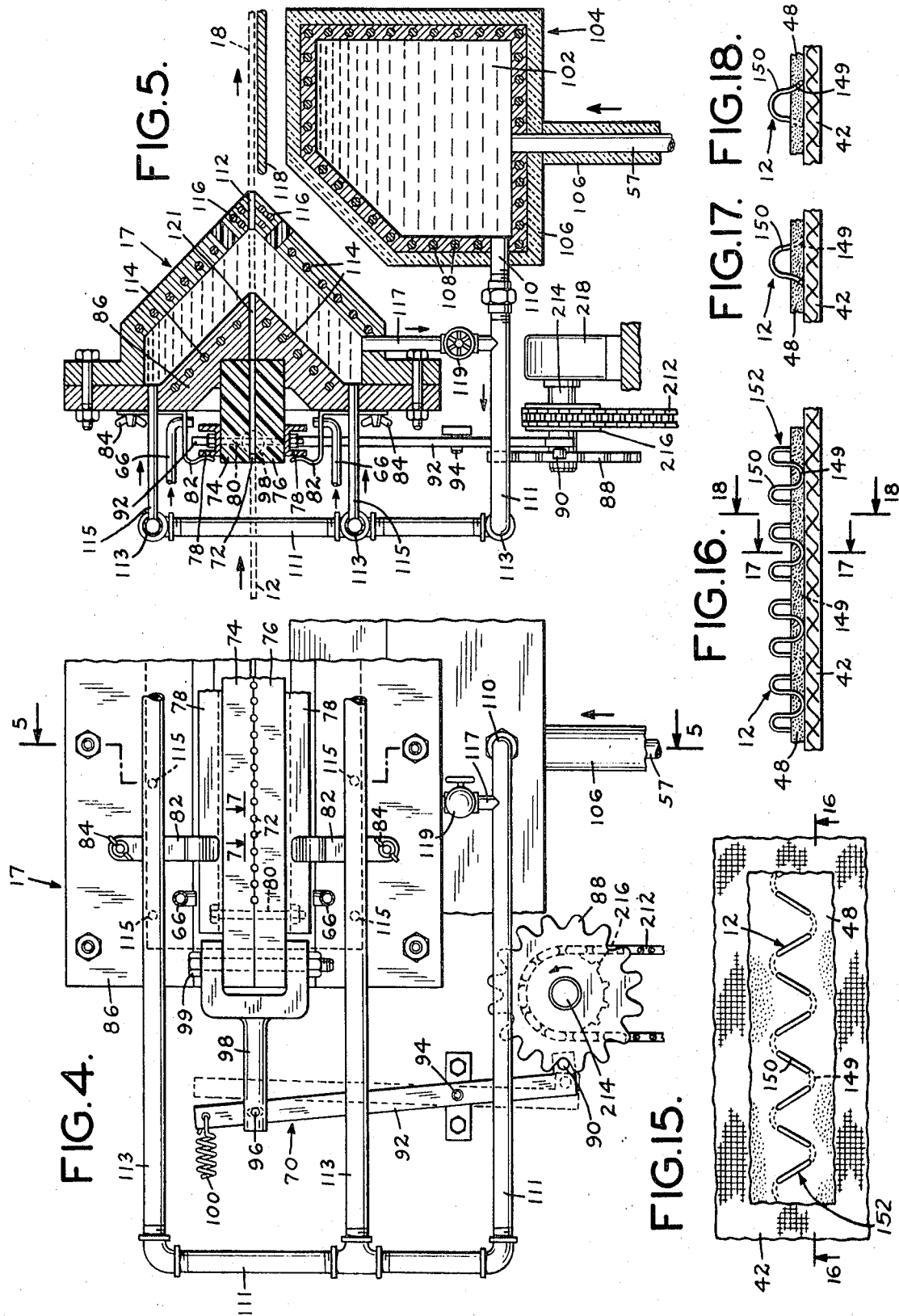

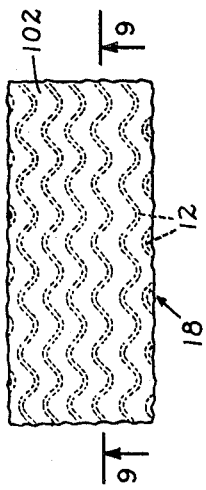
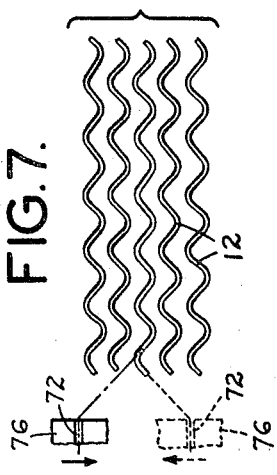
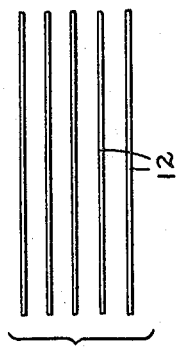
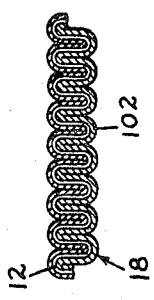
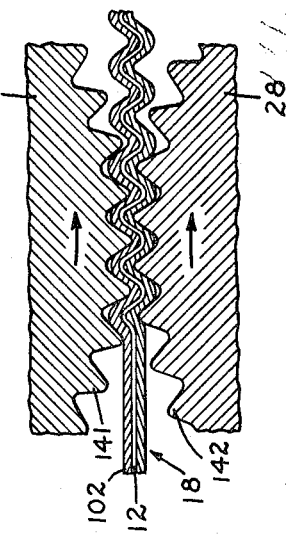
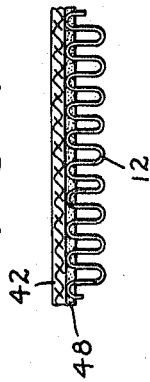
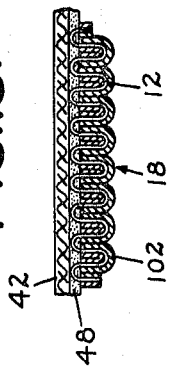
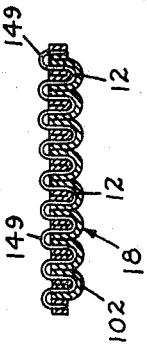

3,562,044
APPARATUS AND METHOD FOR MANUFACTURE OF FABRIC-LIKE PILE PRODUCTS
George H. Erb, Cuttingsville, Vt., assignor to Velcro S.A., Nyon, Switzerland, a corporation of Switzerland
Filed Mar. 12, 1968, Ser. No. 716,265
Int. Cl. B32b *31/00;* C09j
U.S. Cl. 156—155                                   22 Claims

ABSTRACT OF THE DISCLOSURE

Method and apparatus for producing pile products useful in the same manner as conventional woven pile fabrics or, with further processing or conversion steps, useful as hook or loop elements of separable fasteners similar to the woven fasteners disclosed in U.S. Pats. 2,717,437 and 3,009,235 to De Mestral. Instead of weaving, pile strands are laid in parallel spaced relation with one another in a single plane, the strands are encapsulated in a matrix of low-melting-point metal alloy which is extruded with the strands as a thin flat sheet of ductile metal with the strands enclosed therein. The matrix is then corrugated to shape and hold the enclosed strands in desired pile conformation, portions only of each strand are exposed by removing a part of the matrix, the exposed portions of the strands are then secured to a separately formed base sheet material and finally the remainder of the matrix is removed.

FIELD AND BACKGROUND OF THE INVENTION

A typical separable fastener made and sold under the registered trademark "Velcro" consists of a hook part and a loop part, the parts being woven in modified ribbon looms as shown in U.S. Pats. 2,717,437 and 3,009,235. The hook part is woven to form a strong backing sheet of fabric with a loop pile made of monofilaments of a heat settable material such as nylon. The loop pile is heat set and thereafter each separate loop is cut transversely of one leg at a point below the crest of the loop so as to form an individual vertically disposed hook from each loop. The loop part of such fasteners as more particularly shown in U.S. Pat. 3,009,235 is similarly woven but the loop pile is formed from continuous multi-filament yarn which, after weaving and heat setting is brushed out to form multitudinous loops consisting of the separated filaments of each pile yarn. The specific field of the present invention is separable fasteners although pile products made in accordance with this invention may be designed and used as decorative fabrics, rugs, carpets, liners for automobile trunks and the like. The principal advantage of the persent invention over the prior art in either the specific or general field is that the product can be made much more rapidly and thus less expensively than the woven products in such fields. Prior efforts to make simulated pile products have involved the handling and shaping of a large number of discrete filaments or yarns requiring complicated guiding apparatus and apparatus for securing such filaments or yarns to a base sheet. The present invention involves encapsulating the discrete filaments or yarns in a flat ductile sheet which thereafter may be shaped and the filaments may be secured to the backing sheet while remaining in accurately fixed relationship with one another.

SUMMARY OF THE INVENTION

A plurality of separate, very long strands of pile forming material is wound upon a beam in much the same manner as warp yarns are wound upon a beam for use in a weaving loom. The strands are arranged in a sheet, much as in a loom, and are conducted through an extruding head which is effective to form a flat sheet of extruded ductile material upon and enclosing the strands and having a thickness only very slightly exceeding the diameters of the strands. The extruded sheet and the strands therein constitute a capsule which is then shaped to impart a desired configuration to the strands. To form a loop pile the capsule is transversely corrugated as by intermeshing cogged rolls so as to form the encapsulated strands into parallel successive loops or waves of suitable form. The encapsulated corrugated strands are then partially exposed by removal of a portion of the matrix. The exposed portions of the strands are secured to a backing sheet and remainder of the matrix is removed from the strands and backing sheet without damage to either of the latter.

It is preferable to utilize as the encapsulating matrix a material such as low-melting-point metal which will melt at a temperature below that at which damage will be done to the strands or sheet material. The matrix material may be melted for extrusion upon the strands and after cooling and shaping it may be melted for removal from the strands and backing sheet. By proper selection of the matrix material the action of melting for removal may perform the additional function of heat setting of the strands and to this end the melted matrix material may be maintained in a bath heated, well above its melting point if necessary, whereby to heat set the strands at the desired temperature level.

For use as carpeting or decorative materials heat setting may not be desired or if desired may not have to be carried out at anything more than moderately elevated temperatures in order to give the finished product the particular appearance, wearing ability, loft or hand that may be sought. For use as a fastener element it is preferred that the strands of a loop pile product of the present invention be made of heat settable material which is heat set at a temperature closely approaching the maximum which the material will withstand after which the individual loops or some of them are cut to form hooks as disclosed in said U.S. Pat. 2,717,437 aforesaid.

It will be recognized that the corrugation of the encapsulated structure need not consist merely of parallel transverse lines but instead may consist of areas in which the depth and spacing of the corrugations are varied to impart a decorative pattern to the finished product.

Although not limited thereto, the present invention will be described in detail as embodied in the production of continuous sheets of loop pile material particularly adapted to form fastener elements of the general type disclosed in said De Mestral patents. It will be apparent that many features of detailed nature have been included for that particular use and that certain of them may not be required in the production of other pile or loop-pile materials such as carpets and the like.

Thus, since the fastener elements should be heat set and usually employ nylon monofilaments for the pile strands a preferred matrix material is a metal alloy having a particular range of softening and melting temperatures consistent with the melting and desired heat-setting temperatures of nylon but for materials other than nylon other matrix materials may be selected. Also, the apparatus for shaping the pile strands is suitable for the spacing, size and arrangement of loops best suited for use in fastener elements wherein precision is required but for carpet or decorative materials such precision may not be needed and, in fact, may be undesirable from the standpoint of best appearance.

For economical reasons it is preferred to provide a closed system for the metal matrix material which thus may be recirculated from the melting and heat-setting bath to the extruder without any loss of metal and with reduced heat losses. Also, it is preferred to maintain the metal matrix material in an atmosphere to which the metal is inert, at least in all portions of the system wherein the metal is at elevated temperature.

It is an object of the present invention to provide a product and method and apparatus for the continuous production of the same as set forth above. Other and further objects will become apparent from a consideration of the following detailed description of preferred but not necessarily the only forms of this invention taken in connection with the drawings accompanying and forming a part of this specification.

DESCRIPTION OF THE DRAWINGS

FIG. 2 is a vertical sectional view of the same;

FIG. 3 is an elevational view of the rear side of the machine shown in FIGS. 1 and 2, showing driving means for the machine;

FIG. 4 is a fragmentary elevational view taken generally in the plane indicated by the lines 4—4 in FIG. 2;

FIG. 5 is a vertical sectional view taken along the lines 5—5 in FIG. 4;

FIG. 6 is a greatly enlarged fragmentary plan view of the pile strands in the region of line 6—6 in FIG. 1;

FIG. 7 is a view similar to FIG. 6 but taken in the region of line 7—7 of FIG. 1;

FIG. 8 is a view similar to FIG. 6 but showing the configuration of the pile strands encapsulated in a metal matrix in the region of line 8—8 in FIG. 1;

FIG. 9 is a vertical sectional view taken along the line 9—9 in FIG. 8;

FIGS. 10, 11, 12, 13 and 14 are greatly enlarged fragmentary vertical sectional views taken along the lines 10—10, 11—11, 12—12, 13—13 and 14—14, respectively, in FIG. 1;

FIG. 15 is an even more greatly enlarged fragmentary plan view of a preferred form of finished product of the present invention;

FIG. 16 is a vertical sectional view taken generally along the line 16—16 in FIG. 15; and FIGS. 17 and 18 are vertical sectional views taken along the lines 17—17 and 18—18 respectively in FIG. 16.

DESCRIPTION OF PREFERRED EMBODIMENTS OF THE INVENTION

Figure 1:
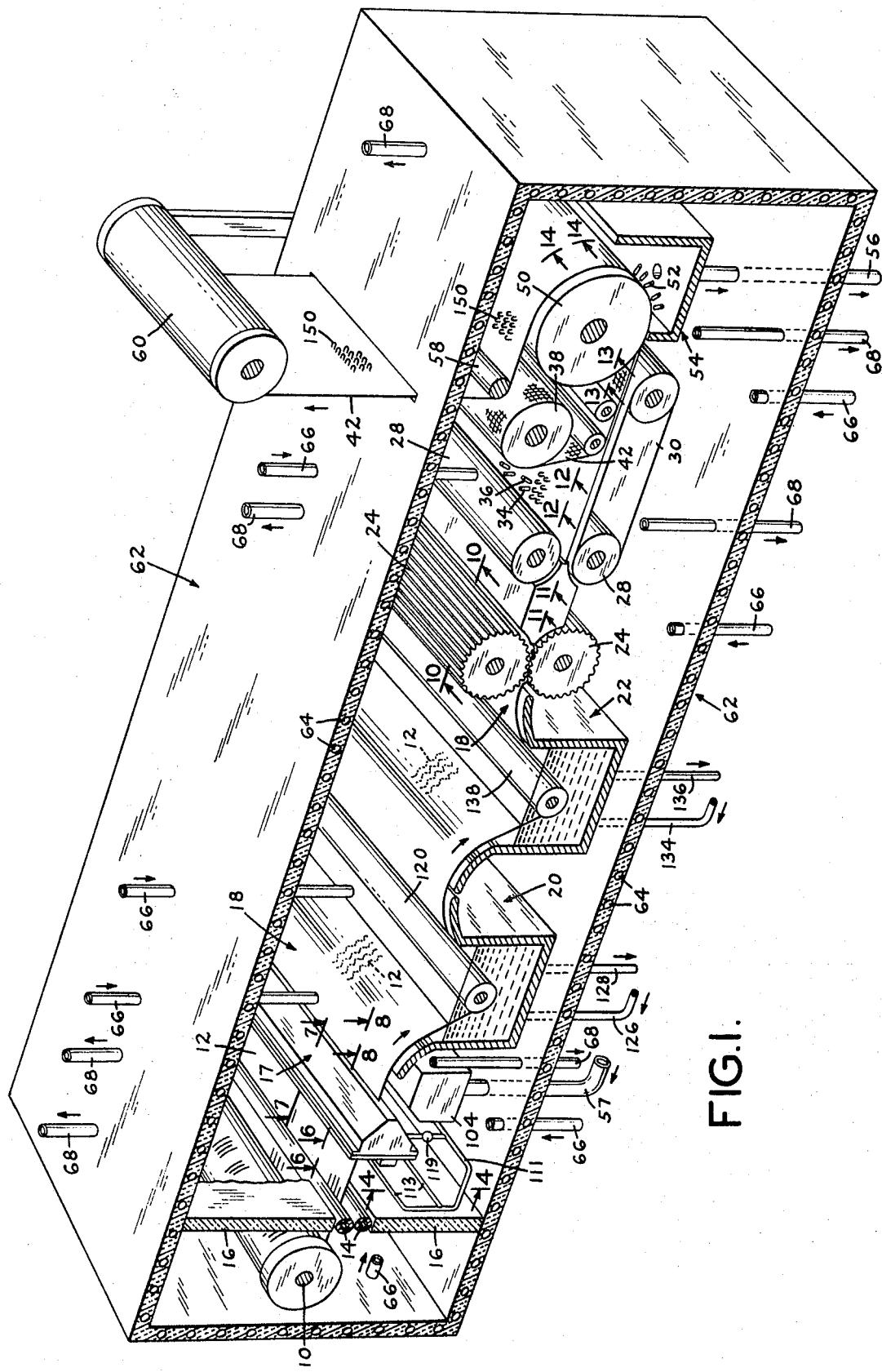
FIG. 1 is an isometric view, with parts in section and parts broken away, of a machine embodying the present invention.

In the commercial manufacture and sale of separable fasteners of the general type disclosed in U.S. Pats. 2,717,437 and 3,009,235 to De Mestral a wide variety of specific forms have become available. The hook and/or loop elements for a hook-and-loop fastener such as shown in Pat. No. 3,009,235, in particular, may have differing numbers of elements per unit area and elements of differing heights or made of different special types or sizes of synthetic material. Therefore, apparatus or methods for the manufacture of such elements preferably should be capable of producing as many of the variants as possible. As will become apparent the apparatus and method of the present invention may be readily adapted to the production of hook or loop elements with widely differ-ent spacing and sizes. The monofilaments used for forming the hook elements usually are of nylon but they may differ in specific composition depending upon the intended end use. In particular, the nylon monofilaments for fasteners in which a maximum holding power is required contain substantial quantities of filling material which makes the filaments and the hooks formed therefrom stiffer than unfilled or less filled filaments. These stiffer filaments therefore are more brittle when received from the supplier and thus require certain precautions in handling which are not so important with less brittle filaments. The present invention will be disclosed in its best form, as required, which is a form including special provisions for the manufacture of hook elements and the use of relatively brittle filaments and it will be understood that the invention, as disclosed, is equally useful in connection with less brittle nylon monofilaments or multifilaments or filaments of either type made of materials other than nylon in connection with which brittleness presents no special problem. It will be pointed out herein which features may be omitted from apparatus intended only for use with relatively non-brittle strands, yarns or filaments.

In FIGS. 1 and 2 a preferred form of apparatus is shown in somewhat diagrammatic manner with the stations thereof identified by letters. Station A is an enclosed space in which there is positioned a beam 10 upon which is wound a suitable number of individual filaments 12, suitable for the particular pile-type product desired, which are progressively unwound from the beam 10 into the form of a horizontally disposed sheet similar to the warp sheet in a loom. As noted above this detailed disclosure is directed primarily to monofilaments. The sheet of monofilaments 12 is guided over suitable guiding and transverse spacing means 14, which will be described in detail hereinbelow, through a partition 16 into the next station. The Station A preferably is refrigerated when the monofilaments 12 are of the relatively brittle type frequently used in the manufacture of the hook parts of separable fastener elements.

Station B comprises an extruder 17 for forming a continuous sheet of matrix material 18 which encapsulates the monofilaments 12. The capsulate 18 comprises a thin film of metal with continuous smooth outer faces with the monofilaments 12 completely enclosed therein and extending in parallel, accurately spaced positions throughout the width of the capsulate 18 (see FIG. 8). The capsulate 18 is then conducted through Station C which comprises a chilling trough 20 and a tempering trough 22. The chilling trough 20 is continuously supplied with a liquid bath such as ethylene glycol maintained at a sufficiently low temperature to cause the capsulate to cool and shrink rapidly. The tempering trough 22 is supplied with a similar liquid which may be maintained at a somewhat higher temperature than the first bath 20 to equalize local stresses and to make the capsulate sufficiently ductile for the next operation.

In Station D the capsulate 18 is transversely corrugated by passing the same through suitably toothed and intermeshed rolls 24. From Station D the corrugated capsulate progresses downwardly to Station E wherein the capsulate is longitudinally compressed to squeeze the corrugations together and in effect to form the capsulate into a much thicker body having substantially smooth surfaces. The frequency and amplitude of the corrugations, of course, is established by the corrugation which occurs in Station D. In Station E the frequency of the corrugations is very materially increased whereas the amplitude remains substantially constant (compare FIGS. 10 and 11). This is accomplished by cramming the capsulate 18 through a passageway 26 into Station F which has a pair of entry rolls 28 which are driven at a substantially lower lineal speed than the speed of the corrugating rolls 24.

In Station F the lower surface of the capsulate 18 is directed onto a metal belt 30 the upper reach of which is supported on a table 32 and is driven at the same linear speed as that of the capsulate 18. A hot gas is supplied to the upper surface of the capsulate 18 through a plurality of closely spaced nozzles 34. The temperature of the hot gas is such as to melt a thin layer of the matrix material forming the upper surface portion of the capsulate 18. A plurality of suction nozzles 36 are located close to the gas nozzles 34 so as to suck up the molten matrix metal and thus to expose the upper portions of the corrugated filaments 12 (see FIG. 12). Preferably sufficient metal is removed to expose an open loop of each filament 12 as shown in FIG. 12.

The capsulate 18 with the exposed portions of filaments 12 is then passed into Station G in which a supply roll 38 of a suitable flexible backing material is so mounted that such backing material is taken from the roll 38 under a guide roll 40 to come into face-to-face contact with the upper surface of the capsulate 18 and the exposed filaments 12. The flexible backing material from roll 38 is in the form of a continuous web 42 and it may comprise a woven or non-woven textile or a film of plastic sheet material as may be desired. The web 42 as supplied from roll 38 may be pre-coated with a layer of adhesive material on the under surface thereof, as viewed in FIG. 2, or it may be uncoated. If a pre-coated web is used the apparatus includes an activator device 44 for heating or otherwise making the adhesive coating ready for adhesion to the exposed portions of filaments 12. If an uncoated web 42 is used the device 44 will be an adhesive applying device for spreading a layer of adhesive on said under side of web 42. In either event the roll 40 and one or more subsequent pressure rolls 46 will be effective to press the activated adhesive 48 (see FIG. 13) into engagement with the exposed portions of filaments 12, preferably in such a manner that the adhesive will flow under the looped filaments 12 and thus to embed the same for firm attachment to the backing web 42.

The Station G is sufficiently long for the adhesive 48 to cool and set in engagement with the exposed portions of filaments 12 and the web 42 next moves with the remaining portions of capsulate 18 into Station H. In Station H there is provided a relatively large guide roll 50 which preferably is refrigerated so as to maintain the web 42 and adhesive 48 below the softening temperature of the adhesive. The remaining portion of the metal in capsulate 18 is thus exposed to a plurality of closely spaced nozzles 52 located within a heated enclosure 54. A hot gas is supplied to nozzles 52 and directed by them onto the metal portion of capsulate 18 thus to melt the metal and cause it to drop off the filaments 12 into the enclosure 54 in which the metal is maintained at such a temperature as to remain fully molten. The molten metal is continuously removed from enclosure 54 through a line 56 and it is returned by suitable pumping and reheating devices as indicated in FIGS. 2 and 3 to the inlet line 57 of extruder 17 for reuse in forming the capsulate 18.

The backing sheet 42 with the looped filaments 12 secured thereto is now free of all metal, as shown in FIG. 14, and leaves guide roll 50 to pass under a guide roll 58 and out of the machine to a take-up roll 60 for the finished pile product.

The machine is preferably enclosed in a refrigerated enclosure 62 equipped with refrigerator tubing 64 and with suitable access doors (not shown) in strategic positions. Also, preferably the interior of the enclosure is maintained filled with recirculated and refrigerated gas of an inert type, such as nitrogen. The gaseous pressure within enclosure 62 is preferably maintained slightly above that of the ambient atmosphere so that entry of air is precluded. The refrigerated inert gas may be supplied to the enclosure through any suitable number of supply pipes 66 and withdrawn through exhaust pipes 68 for recooling and recirculation.

For making hook parts of separable fasteners it is preferred to secure the monofilaments 12 to the backing sheet 42 in a chevron pattern, as shown in FIG. 15, in order that the loops, after being heat set, can be cut to form hooks. The cutting mechanism is not shown herein but may be similar to that shown in said U.S. Pat. No. 3,009,235 in which elongated fingers enter the longitudinal rows of heat set loops to guide them onto the cutting blades of a cutting device which resembles a hair clipper and is operative to cut one leg only of each loop as is well known in this art.

The chevron pattern shown in FIG. 15 may also be desirable for uncut loops in the manufacture of carpets or other decorative pile fabrics or in the manufacture of the loop parts of separable fasteners.

The chevron pattern aforesaid is accomplished herein by oscillating the filaments 12 in a horizontal plane as they enter the extruder 17. The apparatus for this purpose is generally indicated by the reference numeral 70 in FIGS. 2, 3 and 4 and will be further described below. The function of such apparatus is to throw the filaments 12 into a horizontal sinuous path as shown in FIG. 7 just at the time the molten metal in extruder 17 is solidifying whereby the filaments 12 are encapsulated, as shown in FIG. 8, in such sinuous shape. The action of the oscillating means 70 in Station B and the transverse teeth of the corrugating rolls 24 in Station D must be accurately synchronized as will be described below.

The description to this point has been rather general and certain details requiring further description will now be covered.

For the manufacture of hook pieces for separable fasteners using the relatively brittle highly filled nylon monofilaments discussed above it is preferred to provide several beams 10 of filaments in advance of need. Such beams preferably are stored in refrigerated enclosures supplied with inert gas to gradually flood out any air that might be occluded with the wound filaments. When a beam 10 is required in the present machine it is rapidly transferred in pre-cooled condition to the Station A where cooling and bathing in inert gas in continued. The filaments 12 are individually guided between rolls 14 which are preferably provided with a circuferential groove for each filament whereby accuracy of lateral spacing is assured. This may be accomplished quickly by temporarily removing, say, the upper roll 14 and leading the filaments 12 into the now open grooves of lower roll 14.

The filaments 12 enter the extruder 17 through individual holes 72 (see FIG. 4) formed in a removable plate formed from mating upper and lower portions 74 and 76 respectively which are separated along a horizontal plane bisecting each of the lead holes 72. The plate portions 74 and 76 are preferably made of a rigid heat resistant plastic material and are held together by metal channels 67 extending throughout the lengths of the plate portions and bolts 80 positioned at opposite ends (only one end is shown in FIG. 4) of the plate portions 74 and 76. The assembly 74, 76 is held in the body of the extruder 17 by a series of spring clips 82 pivoted on wing screws 84. In operative position of clips 82 bear against the upper and lower channels 78 thus to yieldably hold the assembly 74, 76 for longitudinal sliding movement in a recess in the inlet wall 86 of the extruder 17. Each time a beam 10 is to be replaced the assembly 74, 76 may be removed by loosening the wing screws 84 and swinging the clips 82 out of the way. The portions 74, 76 may be separated to facilitate drawing the filaments 12 into their respective holes 72 by removing the bolts 80. Alternatively an assembly 74, 76 may be provided for each beam 10 in storage and the drawing in of the filaments of each beam in proper relation with the holes 72 of the associated assembly 74, 76 may be performed in advance so that the new beam with its particular assembly 74, 76 may be quickly assembled with the extruder to replace an assembly 74, 76 which has been removed as a result of exhaustion of the preceding beam 10.

The oscillating device 70, referred to above is connected with the assembly 74, 76 to cause the latter to oscillate relative to the remainder of the extruder 17. Thus, a toothed cam wheel 88 is driven at a predetermined speed in engagement with a cam follower 90 mounted on one end of a bell crank lever 92 pivoted at 94 on the machine frame. The opposite end of lever 92 is pivotally connected at 96 with a yoke 98 which, in turn is rigidly secured by a bolt 99 to the assembly 74, 76.

A return spring 100 is connected with the extremity of lever 92 and constantly urges the lever 92 in a counter-clockwise direction as viewed in FIG. 4 thus to maintain the cam follower 90 in engagement with cam 88 whereby rotation of cam 88 is effective to reciprocate the assembly 74, 76 transversely of the lengths of filaments 12. As will be apparent FIGS. 4 and 5 are diagrammatic and scale and proportions are not precise. For example, in the manufacture of hook elements for separable fasteners the nylon monofilaments 12 and thus the guide holes 72 may have a diameter of about 0.009". The excursions imparted by the oscillating device 70 to the assembly 74, 76 need only to be several hundreths of an inch to impart the lateral zig-zag or sinuous pattern to the monofilaments 12 as shown in FIG. 7.

It is important for the success of this invention to use as the matrix metal an alloy having particular characteristics and bearing these characteristics in mind to accurately control the temperature of the metal within the body of the extruder 17. Proprietary low-melting-point alloys are available, for example, under a family of trademarks including the word "Cerro." One such metal is sold under the trademark "Cerro-Safe" which is non-eutectic, that is, it softens and assumes a progressively more mobile slush-like consistency over the relatively wide melting temperature range of from 157° F. to 190° F. It is a solid below such range and is a liquid above such range. The solid form is quite ductile and the liquid form is readily pumpable so long as the temperature is maintained above the melting range. This particular metal may be used over and over again so long as it is protected, especially when in slush or liquid form, by an atmosphere of inert gas, such as nitrogen.

For the present invention the "Cerro-Safe" metal, just described, is particularly desirable. Referring to FIG. 5 the metal 102 in liquid form is pumped through line 57 into a conditioning chamber 104, both the line 57 and chamber 104 being enclosed in suitable thermal insulating material 106. In the conditioning chamber 104 the metal 102 is held, by means of heating coils 108 at a temperature at which it is still in liquid form or at least only very slightly slushy whereby it may be transferred through one or more outlets 110 and conduits 111 branching into manifolds 113 which extend respectively above and below the sheet of filaments 12. The manifolds 113 are connected by tubes 115 with the upper and lower portions of the body of extruder 17. One or more return lines 117 with valves 119 may be provided to drain the extruder body when the machine is shut down, for example when changing beams 10 of filaments 12.

It will be recalled that the monofilaments 12 have been pre-cooled and maintained at a very low temperature and accordingly the metal 102 within extruder 17 will constantly give up heat to the monofilaments 12 as they pass from slit 121 in the inlet wall 86 and rapidly through the extruder. The metal in contact with and adjacent to the monofilaments thus will progressively thicken as a slush and will flow out with the filaments 12 through an elongated slit-like nozzle 112 of the extruder 17. By proper control of the temperature of the metal as related to the temperature and the speed of the incoming filaments 12 the metal will freeze upon the filaments 12 at the nozzle 112 and will emerge with the filaments completely encapsulated in a flat sheet of metal as shown in FIG. 8. It will be appreciated that the extruder 17 may be provided with heating and/or cooling elements. For example heating elements 114 may be provided in the regions remote from the nozzle 112 and cooling elements 116 (for example liquid coolant-circulating tubes) may be provided close to the inner walls of the nozzle 112.

The metal 102 need not be wholly frozen as it emerges from nozzle 112 inasmuch as the nozzle discharges into a refrigerated atmosphere in which final solidification of the thin foil-like encapsulate may occur. At some point within the extruder 17 very close to the nozzle 112 the metal 102 will have become so nearly solid as to hold the filaments 12 against the lateral reciprocation imparted thereto by oscillating device 70. The portions of the filaments extending backwardly from this point to the inlet holes 72 will continue to reciprocate in the more nearly liquid portions of the metal 102 whereby the filaments will be laterally bent into and will freeze in the sinuous or zigzag form as illustrated in FIG. 7. It will be apparent that because of the lengths of the individual filaments 12 extending from guide holes 72 to the solidification zone near nozzle 112 the assembly 74, 76 must be reciprocated through a distance substantially greater than the transverse width of the sinuous path illustrated in FIG. 7. An approximation of the extent of lateral movement of one guide hole 72 is shown in broken lines in FIG. 7.

The nozzle 112 as noted above is a long narrow slit having a vertical dimension, as viewed in FIG. 4, which is only a few thousandths of an inch greater than the diameter of the filaments 12. Thus the filaments will automatically center themselves vertically within the progressively less liquid stream which is forming the capsule and will lie only a few thousandths of an inch below the upper and lower surfaces of the completed metal capsule as is illustrated in FIG. 9.

From a consideration of FIGS. 4 and 5 it will be apparent that design details of the extruder 17 and the supply and conditioning system for the molten matrix metal 102 have not been shown in full. Such details will vary depending upon the manufacturing source of the extruder but, in general, it will be appreciated that thermostatic controls will be required and thermally insulative enclosures will be more widely used than is shown herein.

While the non-eutectic "Cerro-Safe" metal alloy is particularly advantageous for use when the filaments 12 are to be laterally shaped as described above and shown in FIGS. 7 and 8 it also is preferred to use a metal alloy of this type even when the filaments 12 are to remain straight. Eutectic alloys can be used but temperature control must be more precise than is required with the preferred metal.

Returning now to FIGS. 1 and 2 the capsulate 18 emerging from extruder 17 is guided downwardly over a smoothly curved guide plate 118 into a chilled bath 20 and beneath a guide roll 120 to emerge over a smoothly curved guide plate 122. The chilled bath 20 contains a coolant liquid 124, such as ethylene glycol, which is circulated in the bath 20 by a supply line 126 and a return line 128 connected to refrigerating apparatus and pumping mechanism (not shown). The bath 20 may be maintained at any suitable low temperature, for example at 0° F. or below, so related to the temperature and speed of travel of the capsulate 18 as to assure that all increments of the matrix metal 102 in capsulate 18 will be brought well below the lower end of the melting range of the metal.

The coefficient of heat transfer of the metal 102 is very much higher than that of the nylon monofilaments 12. Since the filaments are chilled before they enter the extruder 17, preferably at least about 100° F. below the melting range of the preferred "Cerro-Safe" metal alloy, the filaments will still be quite cold when the metal freezes in the extruder nozzle 112. The filaments 12 thus will be contracted in length at the time the metal 102 freezes and as heat is gradually transferred from the metal to the encapsulated filaments 12 the latter will tend to expand in length but since they are now held in the frozen metal they will assume a precompressed condition within the capsule 18. The metal 102 does not shrink upon freezing, near the lower end of its melting range, but when it is sharply chilled in the bath 20 it does shrink somewhat and very rapidly. Such shrinkage even further lengthwise compresses the encapsulated filaments 12 which because of their low coefficient of heat transfer will not partake at the same rate in the rapid changes in temperature of the metal 102 as it progresses from extruder 17 and through chilling bath 20.

From the chilling bath 20 the capsulate 18 with the precompressed filaments 12 therein is conducted over a smoothly curved guide plate 130 into a tempering bath 22 in which the metal is brought up to a temperature at which it is reasonably ductile. For example the tempering bath 22 may be supplied with a liquid 132 circulated by supply and return lines 134 and 136 respectively. The liquid 132 may be ethylene glycol maintained, say, at about 50° to 90° F. although the specific temperature is not particularly critical. A further peculiar characteristic of the preferred "Cerro-Safe" matrix metal 102 is that while it shrinks rapidly upon chilling it crawls slowly back to its freezing temperature dimensions when it is reheated at a moderate rate. Thus, such expansion of the metal 102 as may occur in the tempering bath 22 is so slight as not to substantially reduce the degree of precompression existing in the encapsulated filaments 12.

In the tempering bath 22 the capsulate 18 is guided beneath a guide roll 138 and over a smoothly curved guide plate 140 into the teeth of the pair of corrugating rolls 24 located in Station D. Referring now to FIG. 10 the capsulate 18 is moving from left to right and enters between the teeth 141 and 142 respectively of the upper and lower corrugating rolls 24. The teeth 141 and 142 are arranged and spaced vertically in such manner as to form laterally extending corrugations throughout the entire width of the capsulate 18. Preferably the teeth 141 and 142 are smoothly rounded so as to form smooth corrugations in the tempered and ductile metal 102 of the capsulate 18. The encapsulated filaments 12 are forced to assume a somewhat longer path by the action of the corrugating rolls 24 and it is for this reason that the filaments have been placed under and maintained in a lengthwise precompressed condition as described above. This is particularly important in cases wherein the filaments 12 are highly filled and thus are somewhat more brittle and inextensible than unfilled nylon filaments. The precompression is not so important and can be eliminated if so desired when unfilled nylon filaments or filaments made of other more flexible and/or extensible materials are used.

The smoothly corrugated capsulate 18 is conducted from Station D (FIGS. 1 and 2) to Station E in which the capsulate is compressed lengthwise to put it into the configuration shown in FIG. 11. To this end the Station E comprises a unit 26 made up of upper and lower guide plates 144 and 146 vertically spaced to form a passageway only slightly higher than the maximum height of the corrugations formed in capsulate 18 by the corrugating rolls 24. The plates 144 and 146 are tapered at the inlet end of the passageway so as to closely approach the nip of the corrugating rolls. Similarly the plates 144 and 146 are tapered at the outlet end so as to closely approach the nip of the rolls 28. The corrugating rolls 24 are driven at a predetermined linear speed which establishes the speed of movement of the capsulate 18 from the extruder 17 and through the baths 20 and 22. The speed of the filaments 12 as they enter the extruder 17 is established by the driven rolls 14 and this speed must be accurately synchronized with the speed of the corrugating rolls 24, as well as the guide rolls 120 and 138 in baths 20 and 22 respectively, in order to avoid any stretching of the filaments 12 as they enter the extruder 17 and become encapsulated in the metal 102. In synchronizing these various rolls account also must be taken of the transverse zig-zaging operation of oscillating device 70 when the latter is used, since this requires a carefully controlled amount of overfeeding of filaments 12 to the inlet of the extruder 17.

In Station E the rolls 28 at the outlet side of the plates 144 and 146 are driven at a substantially slower linear speed than the corrguating rolls 28. Thus the corrugations in capsulate 18 are forced to close up upon themselves within the restricted passageway between plates 144 and 146 while the passageway serves to prevent bulging of the capsulate out of generally planar configuration. The longitudinal compression of capsulate 18 preferably is of such extent that major portions of the successive corrugations in the capsulate are flattened against one another as shown in FIG. 11. The compression of the capsulate to this extent is desirable when it is required that the pile elements or portions thereof in the final product stand substantially vertical. When an undulating or more sparsely distributed pile is desired the degree of longitudinal compression may be lessened or the step of compressing may be omitted whereby the conformation imparted by the corrugating rolls 24 may be preserved.

From Station E the capsulate 18 is conducted through the roll 28 and onto the endless metal belt 30 which has a path extending around the lower roll 28, over the table 32 and around a guide roll 148. As described above the upper surface of the capsulate 18 is now exposed to blasts of heated inert gas emitted from nozzles 34 at such a temperature as to liquify the upper surface regions only of the metal 102 in the capsulate 18. Suction nozzles 36 are located close to each of the heating nozzles 34 whereby the softened or liquid metal is removed through suitably heated and insulated lines (not shown) and discharged in flowable form into the chamber 54. A sufficient number of heating and suction nozzles 34 and 36 is provided to assure that enough metal is softened to flowable slush consistency or to liquid form and removed to expose the open ends 149 of the loops of filaments 12 as shown in FIG. 12. The use of the preferred "Cerro-Safe" metal alloy as the metal 102 is desirable in that a relatively broad range of temperature and suction conditions can be used and precise control of the amount of metal removed can be established. Since the preferred metal is a liquid at temperatures of 190° F. or more it will be apparent that the removal of metal in Station F may be accomplished without harmful effect upon the filaments 12. Temperatures up to about 400° F. may be briefly applied if it is desired to heat set the exposed loops 149.

The exposed loop portions 149 and surface 150 are thus ready for presentation at Station G in which the web 42 of backing material is applied. Station G has been described above and further detailed description is not necessary at this point.

At this point it should be noted that FIGS. 10 through 14 are simplified sectional views inasmuch as no attempt has been made to illustrate the transverse sinuous contour of filaments 12. From a consideration of FIG. 9, which is an accurate sectional view taken along line 9—9 of FIG. 8 it will be appreciated that a true longitudinal sectional view would cut through the filaments and would not reveal the filaments in the continuous form in which they appear in said FIGS. 10 through 14. On the other hand, FIGS. 15 through 18 are on a sufficiently larger scale to permit a more nearly accurate showing of the disposition of the filaments 12.

In FIG. 13 the backing web 42 is shown secured by adhesive 48 to the exposed loop portions 149 of filaments 12. The remaining portions of the filaments 12 are still embedded in the metal 102. It is in this condition that the assembly of backing web 42 and capsulate 18 moves from Station G into Station H. The web 42 comes into contact with the surface of drum 50 and the hot gas jets 52 will melt the metal 102 from the assembly as described above. The temperature of the hot gas used in Station H may be only slightly above the top of the melting range of the encapsulating metal 102. Thus for the preferred Cerro-Safe metal the gas temperature may be quite moderate and not at all likely to injure the adhesive 48 or web 42. When it is desired to heat set the filaments 12 at a higher temperature than the minimum necessary for melting the encapsulating metal such step can be performed or partially performed in Station H. In that event the adhesive 48 should be selected as having a melting point sufficiently high to withstand the required heat setting temperature. However, as noted above the drum 50 in Station H preferably is refrigerated so as to absorb heat from the web 42 and adhesive 48, thus to permit heat setting of the filaments 12 at temperatures that might otherwise soften or destroy the adhesive 48 or might heat-set the adhesive in an undesirably brittle or stiff condition.

When the filaments 12 are nylon which it is desired to set at about 400° F. the adhesive material 48 as applied in Station G may be a B stage epoxy resin which will be relatively unaffected by brief exposure to the 400° F. temperature, particularly when the drum 50 is refrigerated.

If the heat-setting of the final product is completed in Station H or if the product is not to be heat-set the product may be wound on reel 60 ready for use. If all heat-setting or if further heat-setting is desired the product may be conducted out of the machine enclosure 62 and conducted through a heat setting station (not shown) before being wound on reel 60. The latter procedure offers the advantage of reducing the load or the refrigerating apparatus for the interior of the enclosure 62.

In any event the product consisting of a fabric-like web with a loop pile will leave the Station H in the form illustrated in FIG. 14. If the product is to be converted into the hook part of a fastener of the general type shown in the De Mestral patents, supra, the cutting operation, as described above may be performed after the product emerges from enclosure 62 and before it is wound on reel 60. Alternatively, the product may be wound in reels and transported elsewhere for cutting and/or finishing operations.

FIGS. 15 through 18 illustrate the preferred form of the pile product of the present invention, particularly suitable for the production of hook parts for separable fasteners as noted above. In FIG. 15 it will be apparent that the filaments 12 include the portions 149 which are anchored in the adhesive layer 48 and portions 150 which form open loop pile conformations disposed in lengthwise rows with alternate loops extending in opposite angular disposition laterally of the axis of each row. Thus, if observed from the point and direction indicated by the arrow 152 in FIGS. 15 and 16, the loops 150 would look much like a row of croquet wickets. As will be apparent each such row may be aligned with a cutting mechanism such as that illustrated in the De Mestral U.S. Pat. No. 3,009,235, supra, for cutting one leg of each loop 150 to convert each loop to a hook.

As noted above, various elements of the machine disclosed herein must be driven at speeds accurately related and synchronized with the speeds of other elements. In FIG. 3 there is illustrated in somewhat diagrammatic fashion an illustrative system for driving the various elements referred to. The illustrated embodiment utilizes sprocket chains and sprockets, although it will be understood that other equivalent means such as gear trains or the toothed inextensible flexible belts now finding such favor as substitutes for chains, may be used if so desired.

In FIG. 3 a single driving motor 154 is shown as provided with a counterclockwise rotatable drive shaft 157 on which there is concentrically keyed a plurality of driving sprockets of various suitable diameters generally indicated as a group at 156. One such sprocket drives a chain 158 which serves to rotate the drive shafts 160 for the infeed rolls 14 (not visible in FIG. 3) which are geared together by gears 162. Another chain of the group 156 drives a chain 164 which, in turn, drives a counter shaft 166, counterclockwise, on which there is keyed a group of concentric sprockets 168. A sprocket of the group 168 drives a chain 170 which is caused so as to drive a drive shaft 172 for the guide roller 120 in cooling bath 120 is a clockwise direction. Another sprocket in group 168 drives a crossed chain 174 which is effective to rotate the guide roller 132 in tempering bath 22 in a clockwise direction.

Another sprocket in group 156 on motor shaft 156 drives a chain 176 for rotating the lower corrugating roll 24 in a counterclockwise direction. A crossed chain 178 connects the drive shafts of the corrugating rolls 24 so as to drive the upper roll 24 in a clockwise direction. The last sprocket in the motor-shaft group 156 drives a chain 180 for rotating the lower slow-moving roller 28 in Station F in counterclockwise direction and a crossed chain 182 connects the lower roll 28 with the upper roll 28 for clockwise rotation of the latter. A drive shaft 184 for the lower roller 28 carries a group of sprockets 186 which includes one which drives a chain 188 for rotating a shaft 190 concentric with idler roller 148 in a counterclockwise direction. The shaft 190 carries another sprocket 192 which drives a crossed chain 194 for rotating the chilled drum 50 in a clockwise direction.

The group of sprockets 186 includes another sprocket which drives a chain 196 for rotating a drive shaft 198 in counterclockwise direction. A conventional friction drive (not shown) is interposed between the shaft 198 and the take-up reel 60 to compensate in known manner for the increasing diameter of reel 60 as it fills.

The reciprocating mechanism 70 shown at the right-hand end of FIG. 3 is driven by a chain 200 engaging a sprocket on the driven shaft 172 and a sprocket 202 on a shaft 204. Shaft 204 has keyed to it one bevel gear 206. Referring now to FIG. 2 the other bevel gear 206 of a pair is keyed to a stub shaft 208 mounted in a bearing 210 and extending longitudinally of the machine. A sprocket on stub shaft 210 drives a chain 212 which in turn drives a stub shaft 214 shown best in FIGS. 4 and 5. The stub shaft 214 has keyed to it a sprocket 216 for chain 212 and also has keyed to it the cam 88 described above. The stub shaft 214 is supported in a bearing 218 fixed to the machine frame.

No specific mention has been made above to the relative diameters of the numerous sprockets shown in FIG. 3. The drawing is not intended to be to scale but in most instances a very general indication of relative diameters has been illustrated. The detailed description preceding the section devoted to the driving mechanism has included specific relationships between the surface speeds of various elements where such relationships are critical. To review briefly it may be stated that the infeed rolls 14 are driven at a selected surface speed such as to overfeed the filaments 12 into the extruder 17 taking into account the exact amount of shortening of the effective lengths of such filaments which is caused by the transverse zig-zagging thereof when the reciprocating device 70 is used. The surface speed of guide rolls 120 and 138 in baths 20 and 22 is precisely established to feed the capsulate 18 without any stretching thereof and the corrugating rolls 24 are driven at an effective surface speed matching that of the guide roll 138. The slow-down rolls 28 are driven at a predetermined surface speed such as to achieve the desired amount of linear compression of the capsulate 18 and the surface speed of chilling drum 50 may be the same, possibly with some allowance for expansion and/or contraction of the product as it is subjected to heating and cooling. Also, the reciprocating device 70, when used, must be synchronized with the corrugating rolls 24 in order that a tip of each tooth 142 (see FIG. 10) of the lower corrugating roll 24 will fall upon each successive point of maximum lateral deflection of the filaments 12 and a tip of each tooth 141 of the upper corrugating roll 24 will fall upon each successive point of zero deflection thereof. This results in the points of maximum lateral deflection being anchored to the backing sheet 42 as shown in FIG. 14. Thus, when the finished product is inverted, as shown in FIGS. 15 through 18, the open pile loop portions 150 extend in opposite angular disposition as noted above. While this is essential for pile products such as illustrated in FIGS. 15 through 18 and which are to be cut to form the hook element for separable fasteners, it may not be essential for pile products wherein irregularity of appearance may be unobjectionable or indeed, may be desirable.

The particular apparatus for and the sequence of operations in shaping of capsulate 18 and exposing of portions of the strands 12 for eventual attachment to the backing sheet 42 may be varied without departing from the principles of the present invention. For example some portions of the ductile metal may be melted and removed before the capsulate 18 enters the corrugating rolls to facilitate the corrugation step and such operation might expose some portions of the strands 12 while the capsulate 18 remains flat. It will be apparent that for such purpose rows of holes or slots may be formed in the capsulate 18 by appropriately directed hot gas nozzles located ahead of the corrugating rolls 24 in Station D or the restricted passageway 26 in Station E to further assure accuracy or compactness of the shape finally imparted to the capsulate 18 or to reduce the total volume of metal which must be removed in Station F.

What I claim is:

1. In a machine for the manufacture of fabric-like pile products, the combination of
   (a) means for supporting a plurality of discrete pile-forming strands,
   (b) an extruder having an elongated slit-like nozzle for forming a continuous ribbon of extruded material,
   (c) means for continuously advancing a sheet of strands from said supporting means into said extruder and out of the nozzle of said extruder,
   (d) means for continuously supplying in extrudable condition a normally-solid, ductile material to said extruder for extrusion through said nozzle with said sheets of strands to form a continuous solidified ribbon of said ductile material with said strands encapsulated therein,
   (e) means for bending said ribbon widthwise into undulating form,
   (f) means for removing from one surface of said undulating ribbon a portion only of said ductile material to expose longitudinally spaced undulating portions of each strand while leaving the remaining portions of all of said strands encapsulated in said ductile material,
   (g) means for securing a backing sheet material to the exposed portions of said strands, and
   (h) means for removing the remainder of said ductile material to expose the remaining portions of said strands in the form of undulations extending generally vertically from the backing sheet material to which said strands are secured.

2. A machine in accordance with claim 1 in which said means for bending said ribbon comprises a pair of meshing corrugating rolls.

3. A machine in accordance with claim 2 in which said means for bending said ribbon also includes means for longitudinally compressing said undulating ribbon to bring the ridge portions of successive undulations into substantially abutting relationship.

4. In a machine for the manufacture of fabric-like pile products, the combination of
   (a) means for supporting a plurality of pile-forming strands made from a thermoplastic synthetic material,
   (b) an extruder having an elongated slit-like nozzle for forming a continuous ribbon of extruded material,
   (c) means for continuously advancing a sheet of strands from said supporting means into said extruder and out of the nozzle of said extruder,
   (d) means for melting a normally-solid, ductile material having melting characteristics such as to be molten at a temperature below the melting temperature of said strands,
   (e) means for continuously supplying said molten material to said extruder for extrusion through said nozzle with said sheet of strands,
   (f) means associated with said extruder for cooling said ductile material whereby there is produced by said extruder a continuous solidified ribbon of said ductile material with said strands encapsulated therein,
   (g) means for bending said ribbon along lines extending transversely of its length into corrugated form with the tips of at least some of the ridge portions of the corrugations lying in a common plane on at least one of the opposed surfaces of said corrugated ribbon,
   (h) means for melting and removing from said one surface of said corrugated ribbon a portion only of said ductile material to expose longitudinally spaced undulating portions of each strand while leaving the remaining portions of all of said strands encapsulated in said ductile material,
   (i) means for securing a backing sheet material to the exposed portions of said strands, and
   (j) means for melting and removing the remainder of said ductile material to expose the remaining portions of said strands in the form of undulations extending generally vertically from the backing sheet material to which said strands are secured.

5. A machine in accordance with claim 4 in which said means for bending said ribbon comprises a pair of meshing corrugating rolls.

6. A machine in accordance with claim 5 in which said means for bending said ribbon also includes means for longitudinally compressing said corrugated ribbon to bring the ridge portions of successive corrugations into substantially abutting relationship.

7. In a machine for the manufacture of fabric-like pile products, the combination of
   (a) means for supporting a plurality of pile-forming strands made from a thermoplastic synthetic material,
   (b) an extruder having an elongated slit-like nozzle for forming a continuous ribbon of extruded material,
   (c) means for continuously advancing a sheet of strands from said supporting means into said extruder and out of the nozzle of said extruder,
   (d) means for melting a normally-solid, ductible material having melting characteristics such as to be molten at a temperature below the melting temperature of said strands,
   (e) means for continuously supplying said molten material to said extruder for extrusion through said nozzle with said sheet of strands,
   (f) means associated with said extruder for cooling said ductile material as it approaches and passes through said nozzle whereby there is produced by said extruder a continuous solified ribbon of said ductile material with said strands encapsulated therein,
   (g) guide means for said strands as they enter said extruder comprising a bar having a plurality of parallel spaced openings, one for each of said strands, of a diameter such as to provide a snug sliding fit for said strands, (h) means for mounting said bar on said extruder with the openings therein communicating with the interior of said extruder to direct said strands in parallel spaced relation through the molten material in said extruder and toward said nozzle, (i) means for reciprocating said bar relatively to said extruder and transversely of the plane of said sheet of strands to displace those portions of said strands which are being advanced through the molten ductile material in said extruder laterally with respect to those portions of said strands which are in the progressively solidifying material approaching and passing through said nozzle whereby to impart to said parallel strands a transversely undulating conformation in which they become encapsulated in said solidified ribbon of ductile material, (j) means for transversely corrugating said ribbon to impart to said encapsulated strands a vertically undulating conformation, (g) means for melting and removing a portion of said ductile material to expose portions only of said encapsulated strands, and means for securing said exposed portions of said strands to a backing sheet of flexible material, and (k) means for melting and removing a portion of said portions of said ductile material and for heat setting said strands in the conformations in which they are secured to said backing sheet.

8. A machine in accordance with claim 7 in which said bar comprises two parts separable along a plane extending substantially through the longitudinal axes of said parallel spaced openings to expose in each of said parts a portion of each of said openings in the form of a trough whereby upon separation of said parts strands extending from said supporting means may be laid in said troughs in one of said parts, and means for securing said parts together to form said bar ready for mounting on said extruder with said strands individually enclosed in said openings.

9. A machine in accordance with claim 4 in which there is provided cooling means for cooling said strands on said supporting means and for maintaining said strands at a temperature substantially below the melting temperature of said ductile material up to the point at which said advancing strands enter said extruder.

10. A machine in accordance with claim 9 in which there is provided a chilling bath and a tempering bath, means for guiding said ribbon from said extruder into said chilling bath to cool said ribbon to a temperature approximately equal to that at which said strands entered said extruder, and means for guiding said cooled ribbon into said tempering bath to raise the temperature of the ductile material of said ribbon to enhance the ductility thereof preparatory to advancement of said ribbon into said bending means.

11. A machine in accordance with claim 4 in which said means for melting and removing a portion of said ductile material includes means for supporting a portion of the length of said ribbon in generally horizontal disposition, means for directing a plurality of jets of hot inert gas onto the upper surface of said portion of said ribbon to liquefy said ductile material to a predetermined limited depth, a plurality of suction nozzles so positioned with respect to said surface as to remove liquefied ductile material therefrom to a depth such as to expose open loops of each of the strands encapsulated in said material.

12. A machine in accordance with claim 11 in which said means for melting and removing the remainder of said ductile material includes means for directing a plurality of jets of hot inert gas onto said ductile material and onto the strands as said strands become exposed as a result of the melting and removal of said ductile material in which they were encapsulated.

13. A machine in accordance with claim 7 in which said means for transversely corrugating said ribbon comprises two corrugating rolls each provided with alternating ribs and troughs extending parallel with the axis of said rolls, one of said rolls being positioned to engage a first surface of said ribbon, the other of said rolls being positioned to engage the opposite surface of said ribbon and said rolls being pressed toward meshing relationship whereby to form transverse parallel corrugations in said ribbon, means for driving said corrugating rolls, the spacing between successive ribs on said corrugating rolls and the speed at which said rolls are driven being so related to the frequency of reciprocation of said bar as to cause the tips of the ribs on said one corrugating roll to fall upon each successive point of maximum lateral deflection of said strands within said ribbon and to cause the tips of the ribs of said other corrugating roll to fall upon each successive point of zero lateral deflection of said strands, and said means for melting and removing a portion only of said ductile material from said opposite surface of said ribbon being effective to expose portions of said strands including each point of maximum lateral deflection thereof.

14. A method for the manufacture of fabric-like pile products comprising (a) assembling a plurality of discrete strands of pile-forming material in spaced parallel relation, (b) advancing said assembled strands lengthwise through a body of molten normally-solid ductile material, (c) extruding said ductile material in the form of a solidified ribbon with said strands encapsulated therein, (d) removing selected portions of said ductile material from said ribbon to expose portions only of the lengths of each of said strands, (e) while portions at least of the lengths of each of said strands remain encapsulated in said ribbon:
 shaping said ribbon to impart to said strands an undulating conformation, and
 securing a sheet of backing material to the exposed portions of said strands, (f) and thereafter removing the remainder of said ductile material to expose the remainder of all of said strands in the form of undulations extending generally vertically from the sheet of backing material to which said strands are secured.

15. The method of claim 14 in which said strands are made from a thermoplastic synthetic material, said ductile material has melting characteristics such as to be molten at a temperature substantially below the melting point of said strands, and in which said removing steps (d) and (f) are carried out by melting said ductile material at a temperature below the melting point of said strands.

16. The method of claim 15 in which said strands are made from nylon and said ductile material is a metal alloy having a melting temperature range of from about 157° F. to about 190° F.

17. The method of claim 16 in which said removing steps (d) and (f) are carried out by melting said metal alloy at a temperature in excess of about 190° F. but not substantially exceeding about 400° F.

18. The method of claim 17 in which said nylon strands are precooled by refrigeration to a temperature at least about 100° F. below the temperature of said molten metal alloy into which said strands are advanced, in which said strands are advanced into said molten metal alloy in said precooled condition, and in which said advancing step (b) and said extruding step (c) are carried out so rapidly that said ribbon becomes solidified while said encapsulated strands therein are still at a temperature substantially below that at which said metal alloy became solidified.

19. The method of claim 15 in which said removing steps (d) and (f) are carried out by melting said ductile material by directing jets of hot gas, inert with respect to said ductile material, onto those portions of said ductile material which it is desired to remove.

20. The method of claim 14 in which said shaping step (e) is carried out before said securing step (e) and before said removing step (d).

21. The method of claim 14 in which said strands are laterally oscillated as they are advanced into said molten ductile material whereby to impart to said strands a laterally undulating configuration in which they become encapsulated in said ribbon.

22. The method of claim 21 in which said ductile material is a metal alloy having melting characteristics such as to start softening and to exist as a molten slush through a temperature range extending upwardly for about 20° F. to about 30° F. to the temperature at which said metal alloy becomes a molten free-flowing liquid, and in which said extruding step (c) is carried out by progressively cooling said molten alloy to convert it from slush form in a zone in which said strands are being laterally oscillated to solid form in a zone in which said strands become encapsulated in said extruded ribbon.

References Cited
UNITED STATES PATENTS

| | | | |
|---|---|---|---|
| 2,480,984 | 9/1949 | Van Issum | 156—155X |
| 2,491,258 | 12/1949 | Fuhrhop et al. | 156—155X |
| 2,516,559 | 7/1950 | Fuhrhop et al. | 156—155X |
| 2,976,177 | 3/1961 | Warthen | 118—420X |
| 3,038,248 | 6/1962 | Kremer | 29—419 |
| 3,142,611 | 7/1964 | Mills | 156—435X |

JOHN F. CAMPBELL, Primary Examiner

D. C. REILEY, Assistant Examiner

U.S. Cl. X.R.

28—75; 29—419, 424, 527.2; 117—114; 118—420; 156—166, 168, 176

UNITED STATES PATENT OFFICE
CERTIFICATE OF CORRECTION

Patent No. 3,562,044  Dated February 9, 1971

Inventor(s) George H. Erb

It is certified that error appears in the above-identified patent and that said Letters Patent are hereby corrected as shown below:

| | |
|---|---|
| Col. 3, line 67 | "differing" should be --different-- |
| Col. 6, line 38 | "in" second occurrence should be --is-- |
| Col. 6, line 53 | "67" should be --78-- |
| Col. 12, line 7 | "caused" should be --crossed-- |
| Col. 12, line 9 | "is" should be --in-- |
| Col. 13, line 45 Claim 1 | "sheets" should be --sheet-- |
| Col. 14, line 57 Claim 7 | "ductible" should be --ductile-- |
| Col. 15, line 20 Claim 7 | "g" should be --k-- |
| Col. 15, line 25 Claim 7 | "k" should be --l-- |
| Col. 15, line 25 Claim 7 | "a portion of said" should be --the remain |
| Col. 17, line 18 Claim 22 | before "alloy" insert --metal-- |

Signed and sealed this 18th day of January 1972.

(SEAL)
Attest:

EDWARD M. FLETCHER, JR.
Attesting Officer

ROBERT GOTTSCHALK
Acting Commissioner of Pate